United States Patent [19]
Bigalke

[11] 3,867,916
[45] Feb. 25, 1975

[54] INTERNAL COMBUSTION ENGINE IGNITION CONTROL SYSTEM

[75] Inventor: Erhard Bigalke, Wolfsburg, Germany

[73] Assignee: Volkswagenwerk Aktiengesellschaft, Wolfsburg, Germany

[22] Filed: Aug. 28, 1973

[21] Appl. No.: 392,187

[30] Foreign Application Priority Data
Dec. 15, 1972   Germany............................ 2261420

[52] U.S. Cl.... 123/117 R, 123/146.5 A, 123/148 E, 123/179 BG
[51] Int. Cl.............................................. F02p 5/08
[58] Field of Search..... 123/117 R, 146.5 A, 148 E, 123/32 AE, 32 EA, 179 L, 179 BG

[56] References Cited
UNITED STATES PATENTS

| | | | |
|---|---|---|---|
| 3,314,407 | 4/1967 | Schneider........................ | 123/148 E |
| 3,636,936 | 1/1972 | Schutte et al. ............... | 123/179 BG |
| 3,660,689 | 5/1972 | Oishi et al....................... | 123/148 E |
| 3,738,339 | 6/1973 | Huntzinger et al. ............ | 123/117 R |
| 3,749,070 | 7/1973 | Oishi et al...................... | 123/117 R |
| 3,757,755 | 9/1973 | Carner............................. | 123/32 EA |
| 3,811,420 | 5/1974 | Vogel.............................. | 123/117 R |

*Primary Examiner*—Charles J. Myhre
*Assistant Examiner*—Paul Devinsky
*Attorney, Agent, or Firm*—Brumbaugh, Graves, Donohue & Raymond

[57] ABSTRACT

An ignition spark advance control system for a spark-ignited, internal combustion engine includes an integrator that produces a first increasing signal of predetermined slope during a predetermined crankshaft angle of rotation before ignition and a second increasing signal of predetermined slope beginning at the end of said predetermined crankshaft angle of rotation. The second increasing signal has a slope chosen so that at a predetermined high engine RPM, the second signal equals the final value of the first signal at a selected early ignition advance angle before top dead center (TDC). Connected to the integrator is a time-controlled potential storage unit that stores the final value of the first signal at the end of the predetermined crankshaft angle of rotation. A feedback arrangement from the storage unit to said integrator adjusts the slope of the second signal so that, at an engine RPM below the predetermined high RPM, the second signal equals the final value of the first signal at an ignition advance angle between the selected early angle and TDC, the ignition advance angle approaching TDC as the engine RPM decreases below the predetermined high RPM. A comparator is connected to the time-controlled potential storage unit and the integrator and produces an output pulse when the second signal equals the final value of the first signal. Upon receipt of the output pulse, a control arrangement triggers the engine ignition.

15 Claims, 8 Drawing Figures

3,867,916

INTERNAL COMBUSTION ENGINE IGNITION CONTROL SYSTEM

BACKGROUND OF THE INVENTION

United States Pat. application of Bigalke et al., Ser. No. 392,188 entitled INTERNAL COMBUSTION ENGINE PERFORMANCE CONTROL SYSTEM, discloses a system for adjusting the ignition advance angle of a spark-ignited internal combustion engine. The system disclosed therein uses at least two operating parameters of the engine for adjustment of the engine ignition spark advance, the ignition advance being dependent upon at least one characteristic performance curve of values that vary as a function of the operating parameters. The system includes (1) an information storage arrangement for storing the characteristic performance curve values, (2) an information receiver, that is connected to the storage arrangement that responds to the operating parameters, for extracting from the storage arrangement a curve value associated with specific operating parameter values and producing a first electrical signal having an amplitude related to the determined curve value, (3) an analyzer circuit connected to the information receiver for receiving the first signal and producing electrical pulses having duration times related to the first signal amplitude, and (4) a control unit connected to the analyzer circuit for triggering the engine ignition in response to the electrical pulse.

The analyzer circuit, for adjustment of the engine ignition spark advance, in accordance with the invention disclosed in the above-identified patent application, may include (1) a first integrator that integrates a constant voltage and produces an increasing second signal of predetermined crankshaft angle of rotation, (2) a time-controlled storage unit connected to the first integrator that stores the second signal at the end of the predetermined crankshaft angle of rotation and produces a third signal that has an amplitude proportional to the amplitude of the stored signal, (3) a second integrator that receives the first signal at the end of the predetermined crankshaft angle of rotation and produces an integrated voltage output, and (4) a comparator connected to the time-controlled storage unit that receives and compares the integrated voltage output to the third signal and produces an electrical pulse when the integrated voltage output equals the third signal.

The above-identified patent application provides for performance curve control of the ignition advance angle, for which purpose a performance curve storage element, consisting of a mechanical cam or a photographic film disc having elements of varying opacity, stores ignition advance angle values associated with particular values of operating parameters of the engine — such as intake manifold pressure, engine revolutions per minute (RPM) or throttle setting — in analog form. Such storage arrangements are movable relative to an information receiver in response to operating parameters of the engine so that the information receiver extracts from the storage element, performance curve values that correspond to the current operating parameters. The information receiver generates a signal having an amplitude representative of the extracted value. The amplitude signal is then converted in an analyzer circuit to a pulse having a duration time related to the extracted value.

SUMMARY OF THE INVENTION

There is provided, in accordance with the invention, an internal combustion engine ignition control system in which the ignition advance angle is controlled directly as a function of operating parameters, in particular the instantaneous engine speed. Other parameters that may be used are the load on the engine or its mode of operation at a given time, that is, forced or idling, and other temperature or other adjustments and corrective factors. Such operating parameters are normally available for use and, in accordance with the present invention, the expense of a storage arrangement is eliminated. Further, accuracy is not sacrificed since linear control provides a close approximation to performance curve control.

There is provided, in accordance with the invention, an ignition spark advance control system for a spark-ignited, internal combustion engine that includes (1) an integrator that produces a first increasing signal of predetermined slope during a predetermined crankshaft angle of rotation before ignition. The first increasing signal has a final value at the end of the angle of rotation, and the angle of rotation has a duration that is inversely related to the engine RPM so that a large first signal final value represents low engine RPM and a small first signal final value represents high engine RPM. The integrator also produces a second increasing signal of predetermined slope that begins at the end of the predetermined crankshaft angle of rotation and that has a slope chosen so that at a predetermined high engine RPM, the second signal equals the first signal final value at a selected early ignition advance angle before TDC. The control system also includes (1) a time-controlled potential storage unit connected to the integrator that stores the first signal final value at the end of the predetermined crankshaft angle of rotation, (2) a feedback circuit from the storage unit to the integrator that adjusts the slope of the second signal so that, at an engine RPM below the predetermined high RPM, the second signal equals the first signal final value at an ignition advance angle between the selected early angle and TDC, the ignition advance angle approaching TDC as the engine RPM decreases below the predetermined high RPM, (3) a comparator that is connected to the time-controlled potential storage unit in order to receive the first signal final value and that is also connected to the integrator in order to receive the second signal, the comparator producing an output pulse when the second signal equals the first signal final value, and (4) a control device connected to the comparator for triggering the engine ignition in response to the output pulse. Therefore, the control system, in accordance with the invention, does not ultimately determine the slope of the second increasing or sawtooth signal according to a stored curve value, such slope is immediately determined according to the rotational speed of the internal combustion engine at the time. Since the second sawtooth signal is compared with a first increasing or sawtooth signal obtained during a predetermined crankshaft angle of rotation and the ignition is triggered when the amplitudes of these two signals are equal, the system allows for the fact that at different engine revolutions per minute (RPM), any crankshaft angle of rotation — in particular the ignition advance angle will include different periods of time. The effect of that time variation may be eliminated by comparing two sawtooth signals that vary with time in the same manner. The response of the ignition advance angle, as a function of the principal control parameter, that is, engine speed, is given essentially by the characteristic curve of the time-controlled potential storage unit and the feedback loop. The storage unit may be a capacitor having a stored potential that is at least an approximately hyperbolic function of the rotatitonal speed. Since the voltage on the potential storage unit descreases with increasing RPM according to the hyperbolic relationship and the slope of the sawtooth signal generated during the predetermined crankshaft angle is independent of engine RPM, the desired shift of the amplitude equality points of the two signals from an early ignition advance angle toward TDC with decreasing engine RPM is realized and, therefore, the time of ignition shifts towards early ignition with increasing speed and late ignition with decreasing speed.

The integrator may be provided with a device, tripped by a crankshaft angle transmitter, for resetting the integrator at the beginning and at the end of the predetermined crankshaft angle, and the integrator may also constitute the second sawtooth signal generator. Thereby, the integrator generates the first sawtooth signal during the predetermined crankshaft angle of rotation from which the potential storage means generates an amplitude value depending upon speed, usually a voltage, for the integrator signal. After resetting of the integrator at the conclusion of the predetermined crankshaft angle, the same integrator generates a second sawtooth signal having a slope chosen so that at high engine speeds, the ignition will take place in an interval of extreme early ignition. The term "high engine speeds," cannot be assigned a specific meaning valid for all engines. In ordinary automotive engines, the interval of extreme early ignition would be chosen in the range of from 3,000 to 4,000 revolutions per minute.

As previously mentioned, it may be of interest to control the ignition angle not only as a funnction of the engine RPM at a given time but also as a function of other operating parameters. The slope of the second sawtooth is available for this purpose also. In a refinement of the invention, the second sawtooth signal generator, generally, the integrator, has a control input for putting in at least one control signal that will then influence the slope of the second sawtooth signal. To insure that only the slope of the second sawtooth signal will be influenced by these parameters, the control input, especially if the signal generator is an integrator, is preceded by a gate circuit, which, tripped by the crankshaft angle transmitter, is closed during the preassigned crankshaft angle.

In principle, operating parameters may also be allowed to act through the slope of the sawtooth signal generated during the predetermined crankshaft angle of rotation. This will be done, however, only in the case of operating parameters that are to operate at initial engine startup, that is, when the engine is cold. When the engine is warmed up, however, operating parameters should act on the slope of the additional sawtooth signal in the manner described.

Operating parameters used as measures of engine load at a given time may, for example, be a control signal depending on engine load, the intake manifold pressure, the intake airflow or the throttling angle. In addition to, or simultaneously with, other control signals, if desired, a control signal depending on exhaust temperature or obtained by way of an idling contact may be used.

As indicated, the control characteristic of the system is given essentially by the characteristic of the time-controlled potential storage device. There are also possibilities, however, of correcting or otherwise affecting the characteristic with additional circuit elements over the entire speed range or portions thereof. For example, in the feedback line from the potential storage device to the additional sawtooth signal generator, the slope of the second sawtooth signal may be influence by the voltage of the potential storage device at a given time. To influence the ignition angle at all speeds, a voltage divider may be interposed between the second sawtooth generator and the comparator. A multitude of possible circuitries will suggest themselves to those skilled in the art. The differences between the operating parameter control situations when the engine is being started and when the engine is warmed up have been accommodated by providing that engine ignition is controlled directly through a crankshaft angle transmitter. At the moment of starting — and possibly also at low speeds shortly after starting — the control system is rendered inoperative and the ignition angle is determined directly by the crankshaft angle transmitter. In particular, a circuit of this kind may be such that the second sawtooth signal generator is provided with a flip-flop, tripped by a crankshaft angle transmitter, for reset at the end of the predetermined crankshaft angle of rotation, and blocked by the flip-flop when the engine is started. Alternatively, however, the comparator may be followed by a flip-flop triggered by way of a gate that allows actuating signals from the crankshaft angle transmitter to reach the flip-flop only while the engine is starting.

It will be understood that these arrangement are possible only if the crankshaft angle transmitter is designed so that during starting it generates ignition pulses at angles of ignition optimally adapted to this operating mode of the engine. Therefore, one embodiment of the invention provides that a static crankshhhaft angle transmitter has a top dead center (TDC) marking extending only over a crankshaft angle chosen so small that it will trigger an ignition at low speeds only. A static crankshaft angle transmitter is a device that delivers an indication even when the engine is stationary by means, for example, of an open or closed contact. The TDC marking will be so arranged, or the crankshaft angle transmitter provided with such a time constant, that the TDC marking will generate ignition pulses only when the rotational speed of the engine is very low.

The control system may be applied whether the engine is equipped with a capacitor ignition or a transistor coil ignition. While in the former case the ignition energy is stored with low losses in the capacitor and capacitor charging is terminated automatically when the rated voltage is reached, the charging of an ignition coil in a transistor coil ignition must be specially controlled. The simplest method is to cut-in the ignition coil at a particular crankshaft angel after ignition and independent of the engine RPM at the time. Since the crankshaft angle must be selected in consideration of the highest engine speeds that are likely to occur, however, a comparatively high consumption of current and an undesirable heating of the ignition coil at low engine speeds is likely to result. To avoid coil overheating, a further embodiment of the invention provides an approximately constant charge time in the ignition coil over the entire range of engine speeds. Specifically, a flip-flop may be connected between the comparator and the ignition, and actuated by the output signal of the comparator to switch off the ignition coil and an additional output signal obtained by renewed operation of the comparator to switch the ignition coil on. Accordingly, the integrator, after being reset, is recharged to equality of the first and second signals and production of an additional output signal by the comparator. Thereby, use is made of the fact that with varying speed, the crankshaft angle between the comparator output signal triggering the ignition and the second output signal, that is, the "intermission" time in the charging of the ignition coil, varies, in such manner that the ensuing ignition coil charging time is at least approximately independent of the speed.

BRIEF DESCRIPTION OF THE DRAWINGS

A better understanding of the invention can be gained from a consideration of the following description of preferred embodiment, in conjunction with the appended figures of the drawings, wherein.

DETAILED DESCRIPTION OF THE PREFERRED EMBODIMENTS

Figure 1:
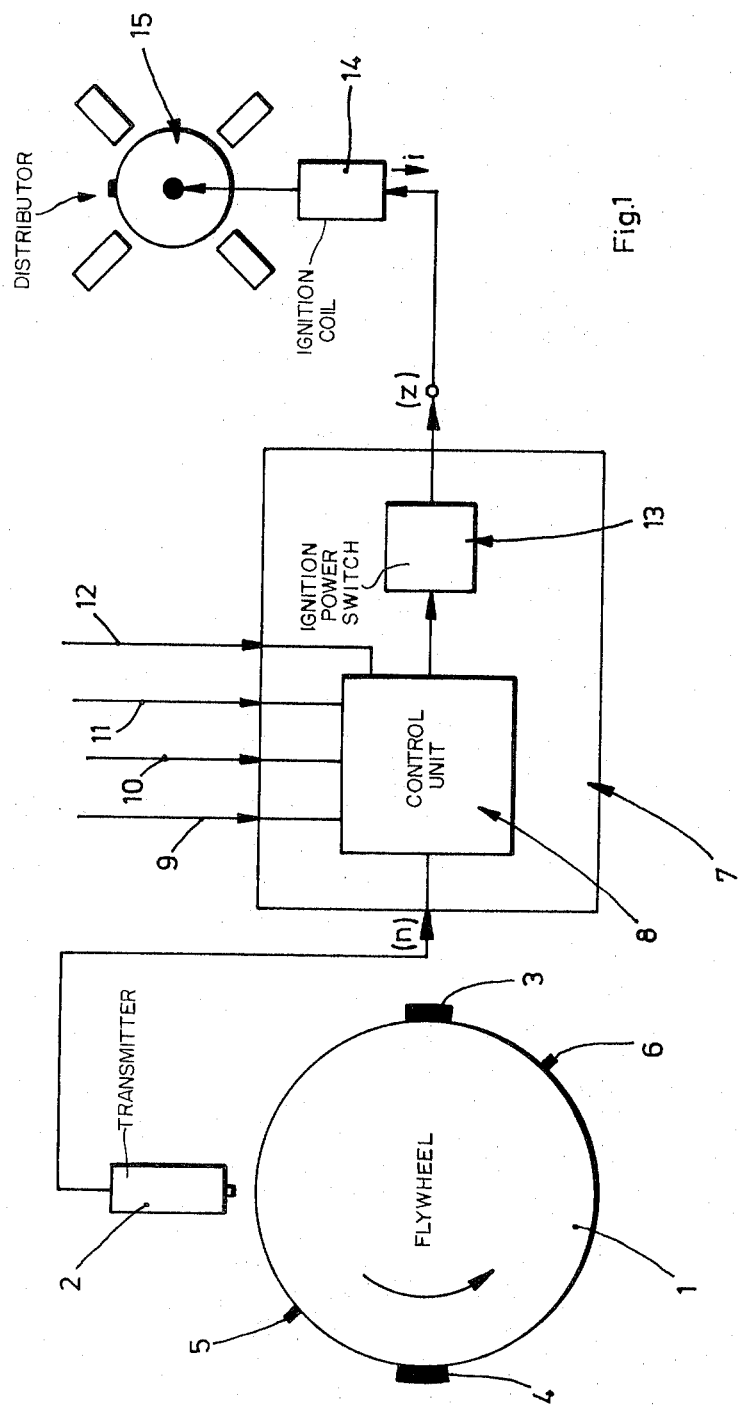
FIG. 1 is a block diagram of an ignition control system in accordance with the invention.

Referring to FIG. 1, an internal combustion engine flywheel 1 is provided with a static crankshaft angle transmitter consisting of a conventional transmitter 2 and markings 3 to 6 on the flywheel. The marking 4 is, for example, assigned an early ignition interval between 45° and 60° crankshaft angle, while the substantially shorter markings are assigned to the top dead center (TDC) and bottom dead center (BDC) positions, respectively. The transmitter 2 transmits signals, which depend on the engine speed $n$ for their duration and time separation, to the ignition electronics, generally designated 7. As an essential control component the ignition electronics includes the control portion 8, which, in FIG. 1, is connected to the crankshaft angle transmitter 2 and to other operating parameters. By way of line 9, the control portion is connected to an idling contact, providing a special control characteristic when the engine is in idling mode. By way of line 10, a conventional electronic fuel injection control signal depending on engine load is applied to the control portion. Other engine operating parameters may be utilized, however, to obtain a control signal depending on load. Line 11 supplies a control signal corresponding to the engine or exhaust gas temperature, and line 12 is impressed, during operation of the engine starter, with a potential chosen so that the ignition advance angle is controlled directly by the ignition angle transmitter markings alone, and, in particular, the TDC marking 5.

The output signals of the control portion 8 are supplied to the ignition power switch 13, which generates the actual ignition pulses with ignition advance angle $z$ by switching off the ignition coil 14. The current passing through the ignition coil is designated $i$. The ignition coil 14 supplies a conventional distributor 15.

Figure 2:
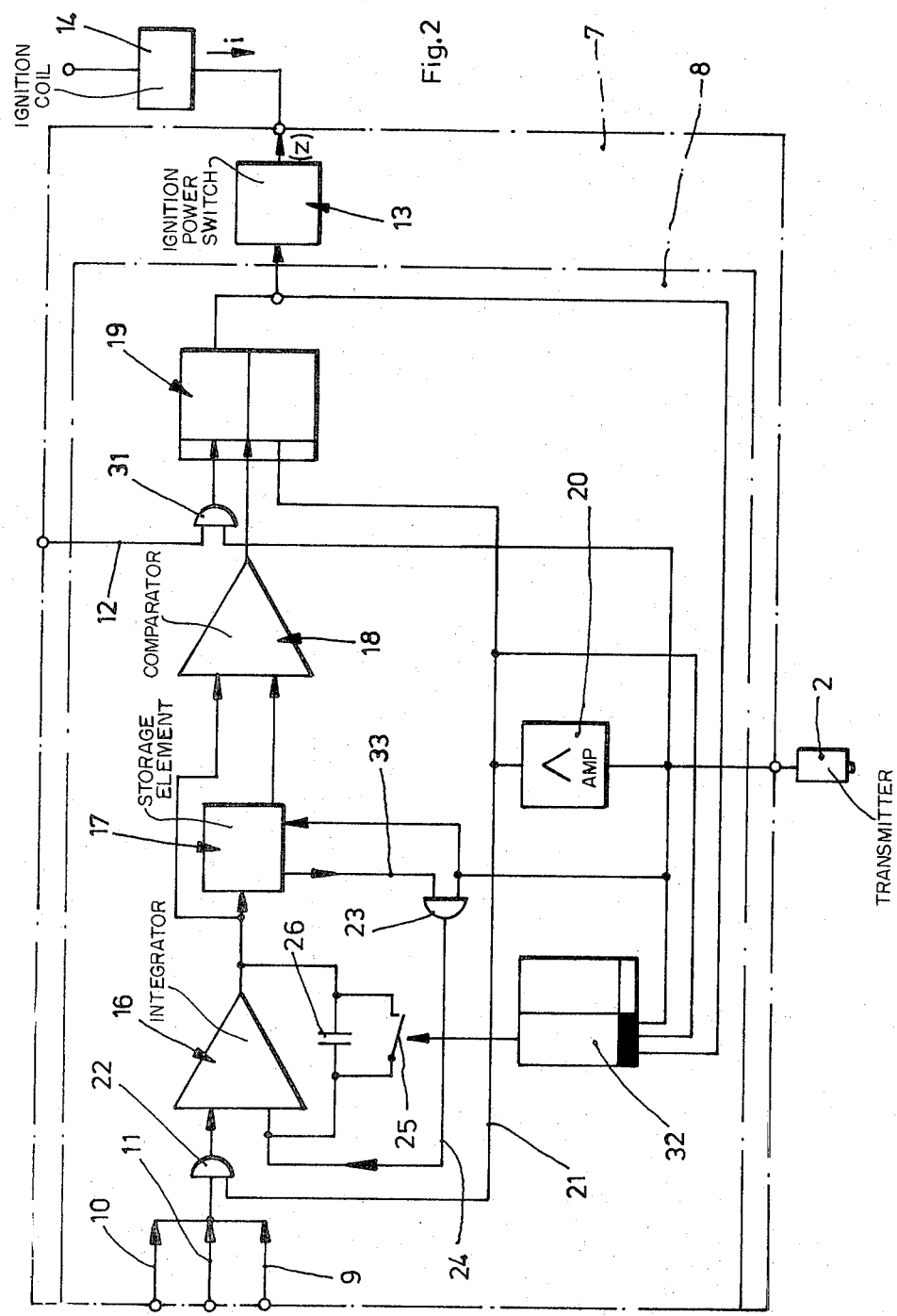
FIG. 2 is a more detailed block diagram of the system shown in FIG. 1.

Referring to FIG. 2, the control portion includes an integrator 16, a time-controlled potential storage 17, and a comparator 18; the output signals from the comparator controlling the flip-flop 19 so that the ignition power switch generates ignition pulses with an ignition advance angel $z$ depending on the engine speed $n$ and the other operating parameters.

In operation, signals from the crankshaft angle transmitter 2 pass, by way of amplifier 20, to line 21, which is connected to one input of gate circuit 22. The control signal lines 9, 10, and 11 are connected together at the other input of gate 22, ensuring that these signals reach the integrator 16 only during formation of a second sawtooth signal and, therefore, affect only the slope of the second sawtooth signal and not that of the sawtooth signal generated during the predetermined crankshaft angle of rotation.

Figure 3:
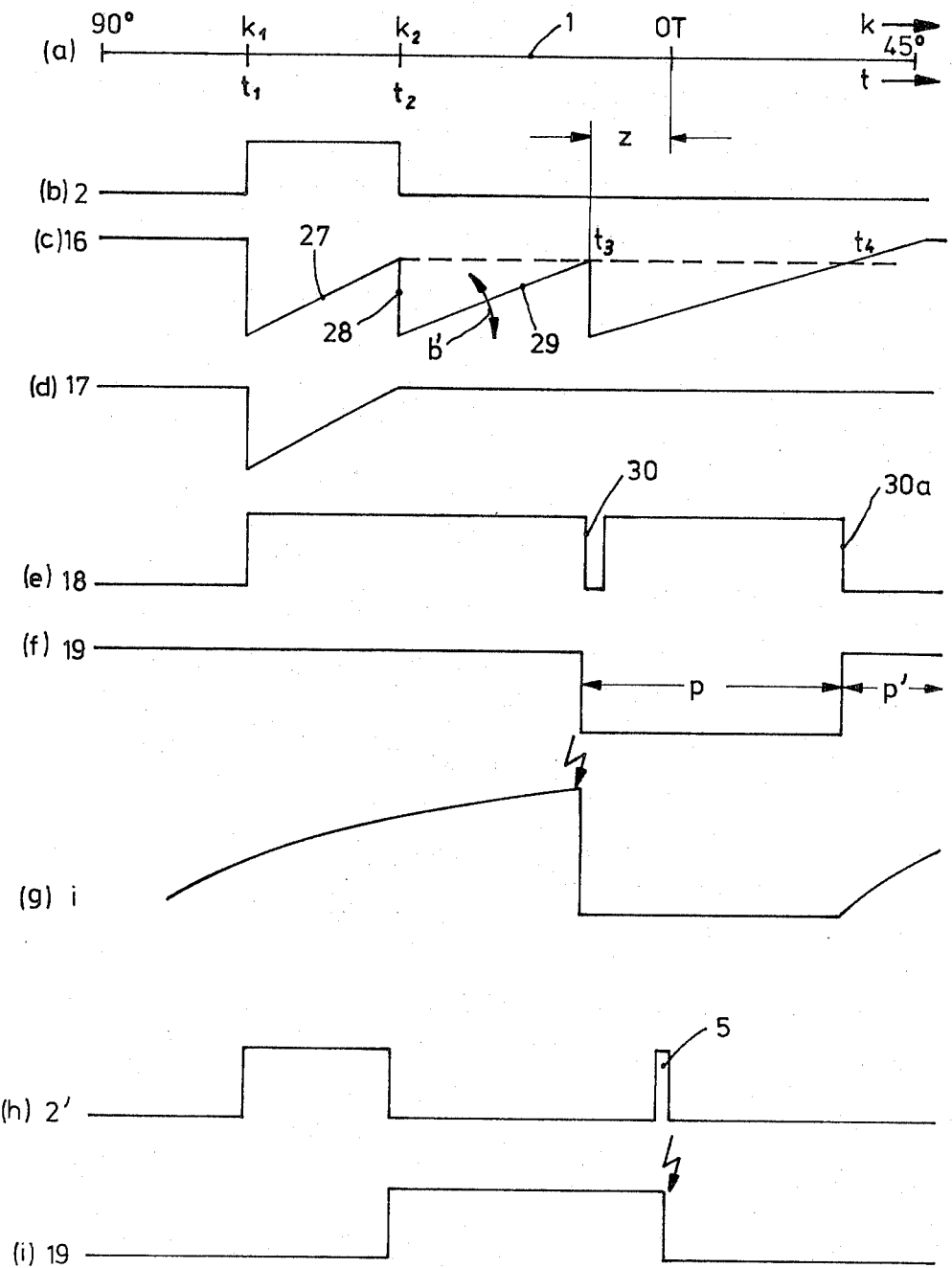
FIG. 3 is a series of graphs of several waveforms, showing the time relationship among the signals developed in various portions of the FIG. 2 system.

FIG. 3$a$ shows the cycle of the flywheel 1 with its markings ($OT = TDC$), while FIG. 3$b$ shows the time position of the signal, in this case a voltage, generated by the crank angle transmitter 2.

The predetermined crankshaft angle of rotation is represented by the period of time, varying with the prevailing rotational speed $n$, between times $t_1$ and $t_2$. Accordingly, the crank angle transmitter 2 produces a signal having a duration that corresponds to the time interval $t_1-t_2$, as shown in FIG. 3$b$. That signal closes gate 22, excluding any influence on the slope of the sawtooth signal generated during the predetermined crankshaft angle of rotation from the control signal on lines 9, 10 and 11. The signal shown in FIG. 3$b$, having a duration that varies with engine speed, passes by way of the AND gate 23 and line 24 to the other input of the integrator 16, so that the latter performs an integration as shown in FIG. 3$c$. At time $t_1$, the integrator 16 is reset by the closing of contact 25 in parallel with the integrating capacitor 26 to permit the capacitor to charge from an initial potential. The result is the sawtooth signal having a rising flank 27 and a maximum voltage 28, which occurs at the end of the predetermined crankshaft angle of rotation, that is, at time $t_2$. The maximum voltage 28 is stored in the time controlled potential storage unit 17. The time-controlled potential storage unit 17 is also in the form of an integrator, so that when reset at time $t_1$, it will charge up to the value of the maximum voltage 28 at time $t_2$.

It is essential that the slope of the rising flank 27 of the sawtooth signal generated during the predetermined crankshaft angle be independent of the speed of the engine, so that the value of the integrated sawtooth signal 28 will be a measure of the variation of the span of time $t_1-t_2$, corresponding to the predetermined crankshaft angle $k_1-k_2$, and, therefore, a direct measure of the continuously changing engine RPM.

Figure 4:
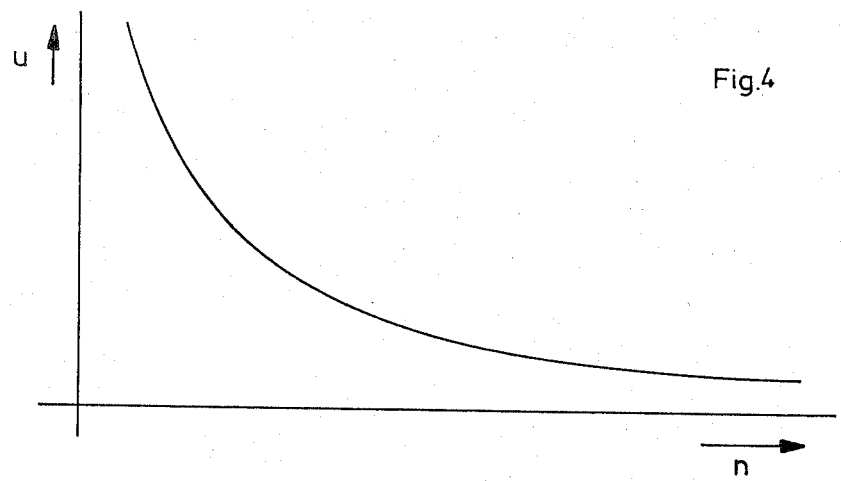
FIG. 4 is a graph of the relationship between stored potential and engine RPM.

The integrator 16 also constitutes a time-controlled device for generating a second sawtooth signal beginning at the end of the predetermined crankshaft angle of rotation, that is, at time $t_2$, that has a well-defined slope. The second sawtooth signal flank 29 is chosen so that at high engine speed the value of the integrated sawtooth signal 28 is attained at a time $t_3$ and the ignition advance angle $z$ is then in the position of extreme early ignition. As FIG. 3a indicates, the ignition advance angle is computed in the conventional manner with respect to TDC, and the predetermined crankshaft angle of rotation $k_1-k_2$ precedes the entire ignition advance angle interval of the engine. Therefore, disregarding the control signals applied over lines 9, 10 and 11, the comparator 18 (see FIG. 3e) generates an ignition-triggering output signal 30 at time $t_3$, which depends on the prevailing engine speed $n$, according to a relationship fixed by the characteristic of the time-controlled potential storage 17 and the integrator 16 feedback. The characteristic of a typical time-controlled potential storage is illustrated in FIG. 4. An approximately hyperbolic relationship is seen between the voltage $u$ of this potential storage and the speed $n$. At high speeds, therefore, the voltage on the storage means is small, and the second sawtooth signal flank 29 attains the value of the integrated sawtooth signal 28 during a comparatively short crankshaft angle of rotation after termination of the predetermined crankshaft angle $k_1-k_2$ early ignition. Conversely, with decreasing engine speed, the voltage $u$ of storage 17 and, thereby, the current in the feedback branch 33, 24 increases rapidly, so that the time of amplitude equality, designated $t_3$ in FIG. 3c, may occur behind TDC: late ignition.

Figure 5:
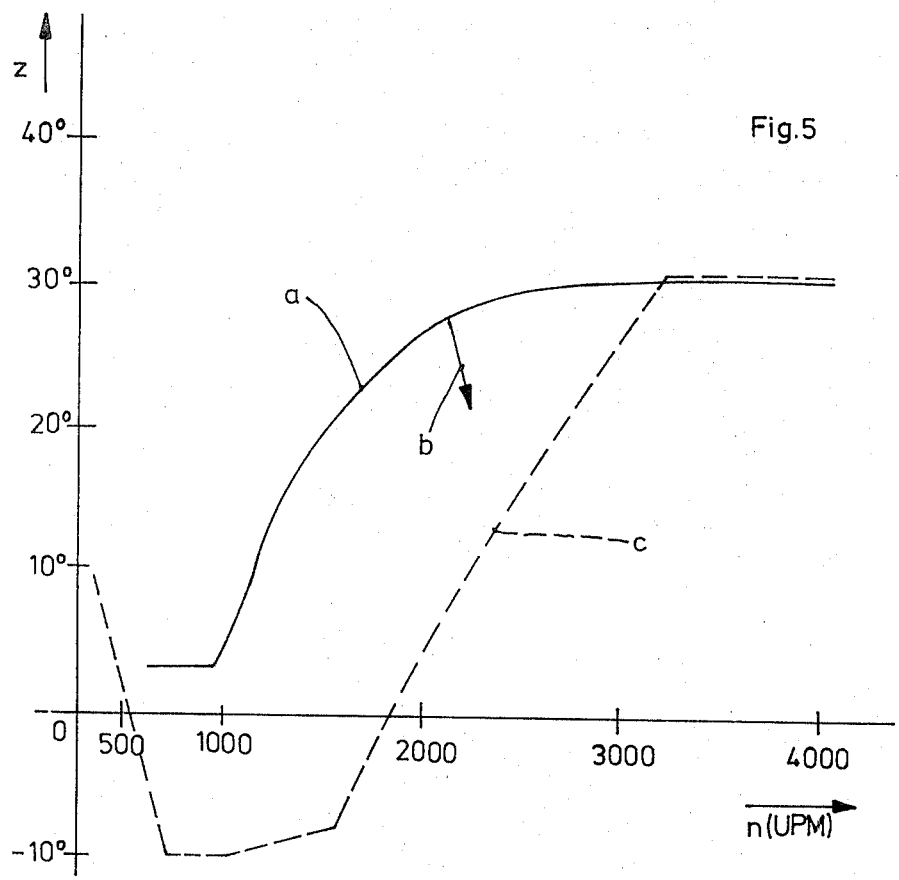
FIG. 5 is a pair of graphs showing the relationship between ignition advance angle and engine RPM.

The resulting ignition advance angle $z$ as a function of engine speed $n$ is shown in FIG. 5. Referring to curve $a$, which applies to normal engine operation, the variation of ignition advance angle $z$ with engine speed $n$ is shown under full-load conditions. Other curves, lying below the full-load curve as indicated by arrow $b$, are obtained if the additional control signals are allowed to reach the integrator 16 by way of line 9 and 11. Load signals supplied by way of line 10, however, lead to curves above the full-load curve $a$. These additional control signals influence the slope of the second sawtooth signal flank 29 as indicated by arrow $b$ in FiG. 3c. Thus there is superimposed on the basic sawtooth flank slope, which has been selected to obtain extreme early ignition at high engine speeds, an additional slope in the nature of a correction to allow for the other control signals. As may be seen in FIG. 3c, it is important that the sawtooth signal flank 27 generated during the predetermined crankshaft angle of rotation, not be influenced by the control signal inputs.

The output signals 30 of the comparator 18 reach the ignition switch 13, shown in the form of a transistor coil ignition, not directly but by way of flip-flop 19. Flip-flop 19 ensures a constant period of time for charging the ignition coil 14. It is supplied by way of line 21 with synchronizing signals from the crankshaft angle transmitter 2. After resetting of the integrator 16 at time $t_3$, it is recharged at a slope determined by the required charging time of the ignition coil to amplitude equality (time $t_4$), so that comparator 18 generates the additional output signal 30a. Since the distance between $t_3$ and $t_4$ depends on the prevailing speed, pulse pauses $p$ of different lengths according to the engine speed will result at the output of flip-flop 19. These pauses are considerably longer at low speeds than at high speeds, so that the duty ratio between the pulse time $p$ and the pause time $p$ varies with engine speed in the direction of a lengthening of pulse time with increasing speed. If the charging of the ignition coil 14 is suppressed during the pauses $p$, a charging time is obtained that is approximately independent of engine speed. The current through coil 14 is shown in FIG. 3g. Note that the time $p$ is so chosen that the current $i$ has at least approximately reached its maximum at the time of ignition $t_3$, so that any lengthening of the interval $p'$ would essentially lead only to unnecessary heating of the ignition coil.

In FIG. 5, the control signal transmitted from the idling contact over line 9 changes curve $a$ into curve $c$. The area above curve $c$ applies to the engine operating under load and the area underneath it to unloaded engine idling. At very low speeds, that is, at speeds below 800 RPM, the curves are no longer accurate.

while starting the engine, the ignition advance angle $z$ is controlled directly by the crankshaft angle transmitter markings and the control electronics are suppressed. For this purpose, the flip-flop 19 is triggered by way of gate 31 not only by the crankshaft angle transmitter 2 but also by the starter (by way of line 12). Only at low speeds does the crank angle transmitter 2 supply a signal corresponding to the TDC mark 5 (see FIG. 1) to gate 31, so that when the starter is actuated simultaneously, flip-flop 19 actuates the ignition power switch 13, according to that marking. That operation is illustrated in FIGS. 3h and 3i, the former representing the signals of the crankshaft angle transmitter and the latter representing the mode of operation of the flip-flop 19.

The flip-flop 32, responsible for resetting the integrator 16, may meanwhile be prevented from tripping as described hereinafter with reference to FIG. 6.

Gate 23 provides a link in the feedback branch 33 offering the possibility of influencing the control characteristic of the time-controlled potential storage 17, as will be discussed in detail with reference to the circuit diagram of FIG. 8.

Figure 6:
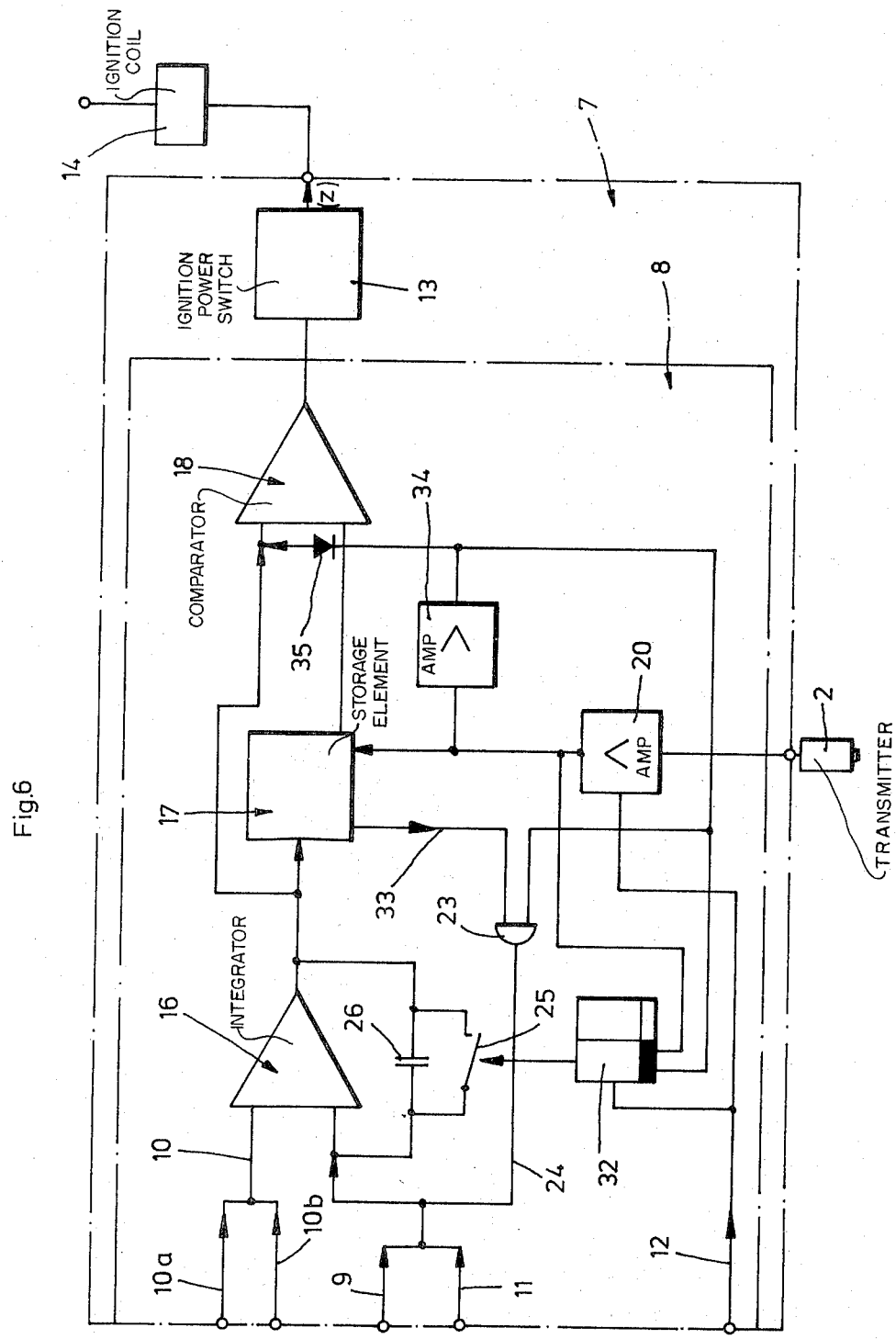
FIG. 6 is a block diagram of a further embodiment of the invention.

In the embodiment of FIG. 6, in which similar devices are identified with the same reference numerals as those used in FIGS. 1–5, the flip-flop 19 is omitted. Accordingly, the flip-flop circuit 32 for resetting the integrator 16 must be blocked when it starts to defeat the control circuit. Therefore, line 12, connected as previously described to a starter contact, carries a positive potential to the control input of the flip-flop 32, preventing it from being tripped. In addition, the amplifier 20, which together with the additional amplifier 34 and diode 35 forms a logic circuit, is energized by the potential on line 12 so that during starting, the signal is inverted at diode 35 ahead of comparator 18 and the comparator is not reset at time $t_3$, when the potentials are equal. This is accomplished by the diode circuit designated generally by 36 in the circuit diagram of FIG. 8. While the behavior of the output signal of comparator 18, in the normal operating mode of the engine, is as shown in FIG. 7e, the starting arrangement will prevent resetting of the comparator at time $t_3$, so that the TDC marking 5 of the crankshaft angle transmitter will also produce an ignition. The second ignition in the region of flank 30 does not interfere with the operation of the engine.

During starting, therefore, the curve of FIG. 7f represents the output voltage of the comparator and the curve of FIG. 7g represents the operative markings of the crankshaft angle transmitter.

Figure 7:
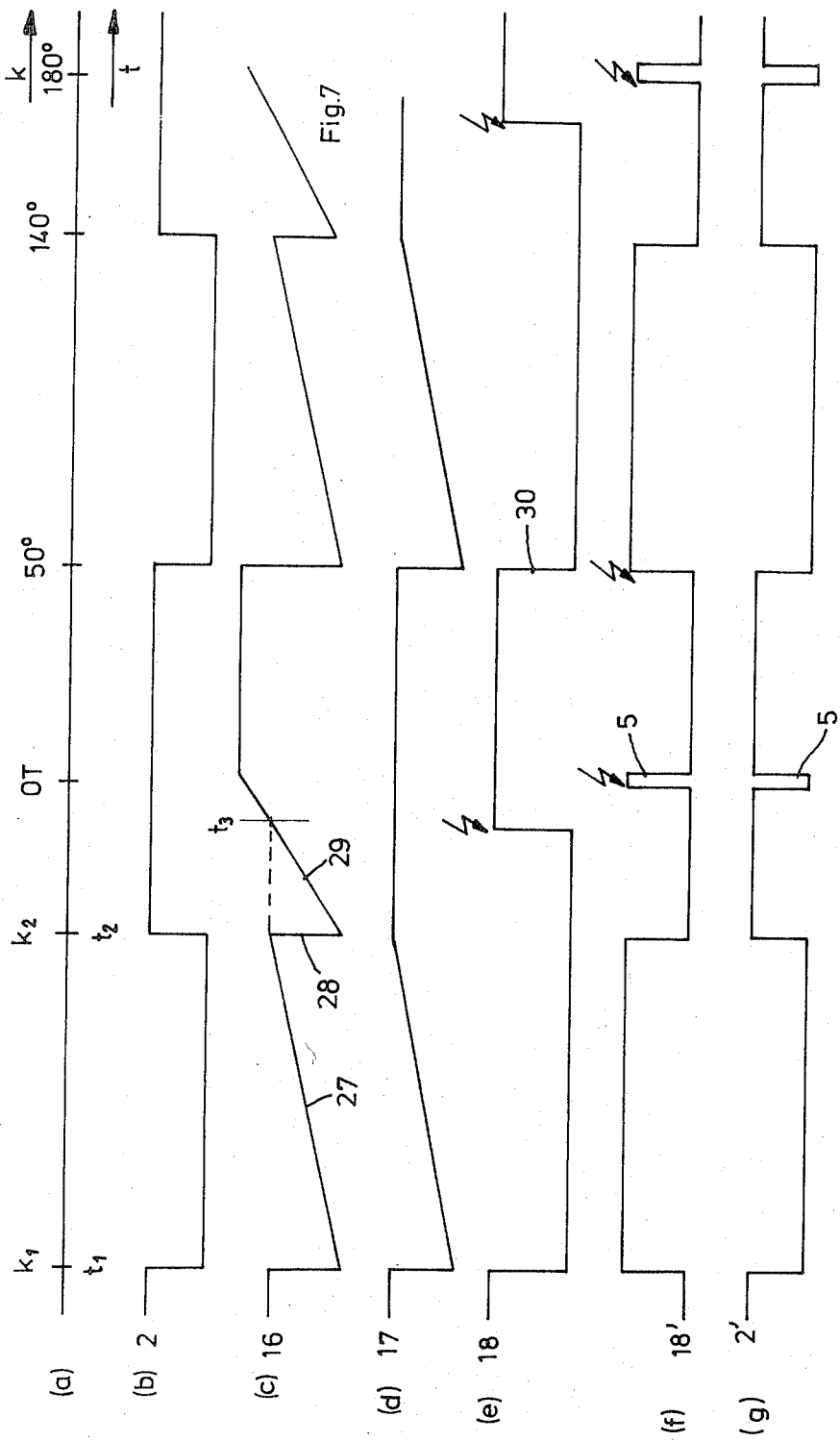
FIG. 7 is a series of graphs of several waveforms, showing the time relationship among the signals developed in various portions of the FIG. 6 system.
Figure 8:
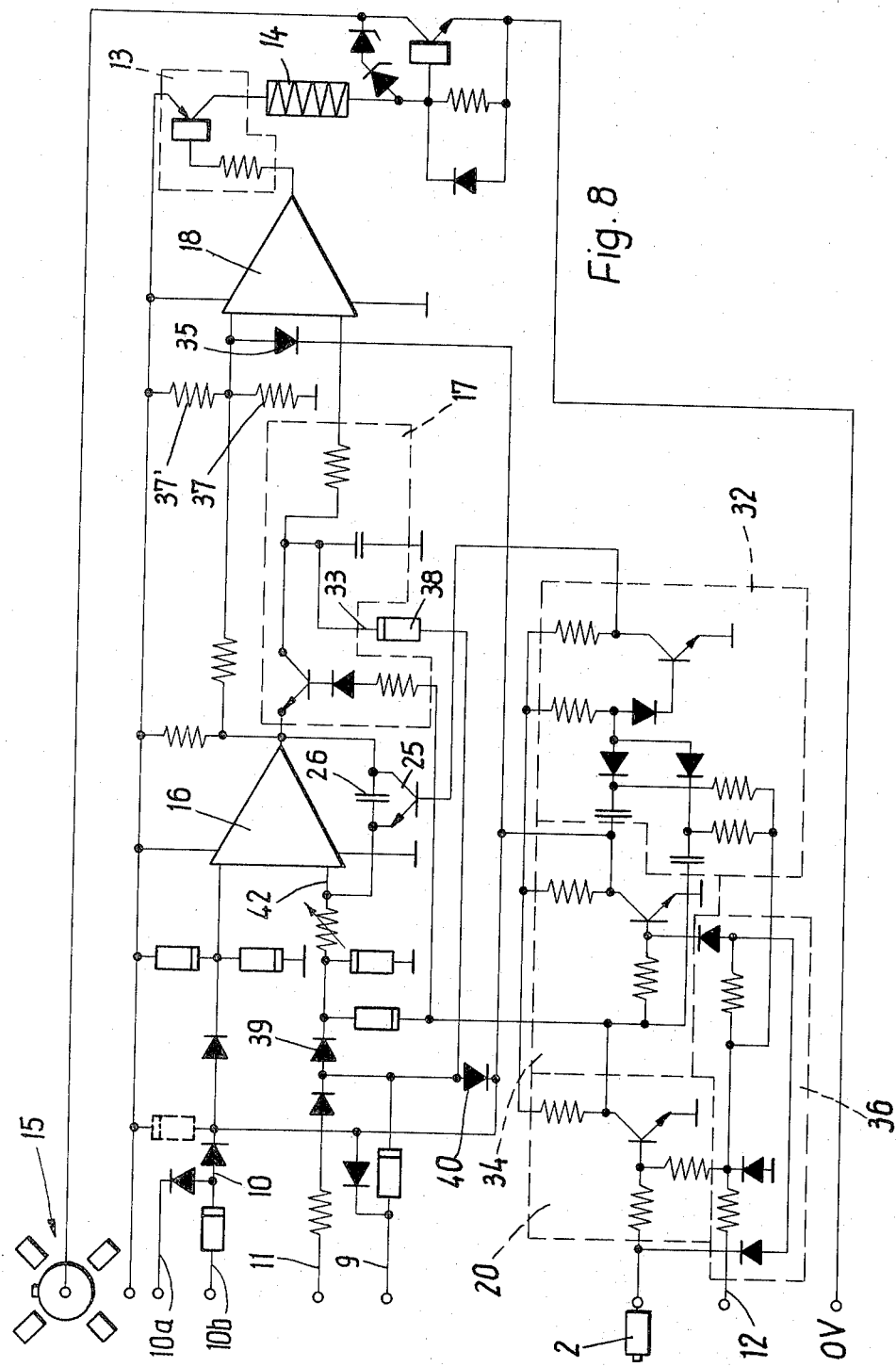
FIG. 8 is an electrical schematic of the system shown in FIG. 6.

In the embodiment of FIGS. 6, 7 and 8, various additional control operating parameters are considered as described above. Line 10, in the present embodiment, is impressed, by way of lines 10a and 10b, with two different load functions, the first obtained from a full-load contact on line 10a and the second obtained by measurement of airflow on line 10b. It has been found that to attain a load control that results in an engine exhaust that is as non-toxic as possible, it is best to measure the flow of air supplied to the engine with a logarithmic potentiometer. That application of each potentiometers is conventional. The output or loop voltage of such a potentiometer provides an especially favorable curve for the control characteristic of FIG. 5, that is, small setting signals at high speeds and comparatively large setting signals at low speeds, so that the load control is above the curve marked a in FIG. 5 throughout the entire speed range.

The circuit arrangements of FIGS. 6 to 8 differ further from that of FIGS. 2 and 3 in that no additional provisions are made to obtain a constant charging time of the ignition coil 14. Rather, the coil is "cut-in" during a constant crankshaft angle, namely during the predetermined crankshaft angle.

FIG. 8 is the circuit diagram of the embodiment shown in FIG. 6 in block diagram form. Preceding the comparator 18 is a voltage divider 37, 37' that makes it possible to influence the characteristic curve of FIG. 5 throughout the speed range. The link in the feedback branch 33 from the time-controlled potential storage 17 to the input of the integrator 16, by way of resistance 38 and diode 39 in cooperation with diode 40, further affords the possibility of varying the control characteristic within wide limits. A positive potential applied to the lower input 42 of the integrator 16 reduces the slope of the additional sawtooth signal with decreasing rotational speed. The feedback of a quantity having the speed dependency of FIG. 4 to the integrator effects the characteristic curve of FIG. 5.

Although the invention has been described with reference to specific embodiments thereof, many modifications and variations of such embodiments may be made by those skilled in the art without departing from the inventive concepts disclosed. Accordingly, all such modifications and variations are intended to be included within the spirit and scope of the appended claims.

I claim:

1. An ignition spark advance control system for a spark-ignited, internal combustion engine comprising, in combination;

a. integrator means for (1) producing a first increasing signal of predetermined slope during a predetermined crankshaft angle of rotation before ignition, said first increasing signal having a final value at the end of said angle of rotation and said angle of rotation having a duration that is inversely related to the engine RPM whereby a large first signal final value represents low engine RPM and a small first signal final value represents high engine RPM and (2) producing a second increasing signal of predetermined slope beginning at the end of said predetermined crankshaft angle of rotation, said second increasing signal having a slope chosen so that at a predetermined high engine RPM, said second signal equals said first signal value at a selected early ignition advance angle before TDC;

b. time-controlled potential storage means connected to said integrator means for storing said first signal final value at the end of said predetermined crankshaft angle of rotation;

c. feedback means from said storage means to said integrator means for adjusting the slope of said second signal so that at an engine RPM below said predetermined high RPM said second signal equals said first signal final value at an ignition advance angle between said selected early angle and TDC, said ignition advance angle approaching TDC as said engine RPM decreases below said predetermined high RPM;

d. comparator means connected (1) to said time-controlled potential storage means for receiving said first signal final value and (2) to said integrator means for receiving said second signal, said comparator means producing an output pulse when said second signal equals said first signal final value; and e. control means connected to said comparator means for triggering said engine ignition in response to said output pulse.

2. An ignition spark advance control system according to claim 1, wherein said system further includes reset means, connected to said integrator means, for resetting said integrator means at the beginning and at the end of said predetermined crankshaft angle of rotation, said reset means being controlled by a static crankshaft angle transmitter that produces a reset signal at the beginning and at the end of said angle of rotation.

3. An ignition spark advance control system according to claim 1, wherein said integrator means includes at least one input for engine operating parameters for adjustment of said chosen slope of said second signal.

4. An ignition spark advance control system according to claim 3, wherein said at least one input includes gate means, controlled by a static crankshaft angle transmitter, so that said operating parameter inputs are prevented from reaching said integrator means during said predetermined crankshaft angle of rotation.

5. An ignition spark advance control system according to claim 3, wherein said at least one input includes a control signal representative of engine load.

6. An ignition spark advance control system according to claim 3, wherein said at least one input includes a control signal representative of engine exhaust temperature.

7. An ignition spark advance control system according to claim 3, wherein said at least one input includes a control signal representative of an engine idling condition.

8. An ignition spark advance control system according to claim 1, wherein said feedback means includes means for feedback of the prevailing voltage of the time-controlled potential storage means for adjustment of said second signal slope.

9. An ignition spark advance control system according to claim 1, wherein said system further includes voltage divider means between said integrator means and said comparator means to influence said ignition advance angle at all engine RPM.

10. An ignition spark advance control system according to claim 1, wherein said system further includes engine starter means, including static crankshaft angle transmitter means, for controlling said engine ignition on starting of said internal combustion engine, said transmitter means producing a pulse at TDC for triggering said engine ignition.

11. An ignition spark advance control system according to claim 10, wherein said system further includes first flip-flop means, responsive to said static crankshaft angle transmitter means, for resetting said integrator means at the end of said predetermined crankshaft angle of rotation and further wherein said starter means inhibits said integrator means resetting during starting of said internal combustion engine.

12. An ignition spark advance control system according to claim 10, wherein said starter means further includes gate means connected to said static crankshaft angle transmitter means and further wherein said system includes second flip-flop means connected to said comparator means and said control means for receiving said output pulse and for producing an output pulse representative to said control means, said flip-flop means being connected to said gate means so that said TDC pulse is received by said flop-flop means only on starting of said internal combustion engine.

13. An ignition spark advance control system according to claim 10, wherein said static crankshaft angle transmitter means includes a TDC mark of short length on the engine crankshaft so that said transmitter produces said TDC pulse only at low engine RPM.

14. An ignition spark advance control system according to claim 1, wherein said control means includes a transistor coil ignition and further wherein said system includes means, connected to said control system, for maintaining an approximately constant charge time for the ignition coil over the entire engine RPM range.

15. An ignition spark advance control system according to claim 14, wherein said charge time maintainance means includes flip-flop means connected to said comparator means and said control means for receiving said output pulse, said comparator means producing a second output pulse when said second signal equals said first signal final value for the second time after said predetermined crankshaft angle of rotation, said flip-flop means preventing charging of said coil upon receipt of said output pulse and permitting recharging of said coil upon receipt of said second pulse.

* * * * *

UNITED STATES PATENT OFFICE
CERTIFICATE OF CORRECTION

Patent No. 3,867,916  Dated February 25, 1975

Inventor(s) Erhard Bigalke

It is certified that error appears in the above-identified patent and that said Letters Patent are hereby corrected as shown below:

Col. 2, line 67, "anglewill" should read -- angle - will --;

Col. 3, line 10, "screases" should read -- creases --;

Col. 3, line 39, "funnction" should read -- function --;

Col. 4, line 11, "influence" should read -- influenced --;

Col. 4, line 61, "angel" should read -- angle --;

Col. 5, line 22, "embodiment" should read -- embodiments --;

Col. 6, line 17, "angel" should read -- angle --;

Col. 7, line 27, "$k_1-k_2$" should read -- $k_1-k_2$: --;

Col. 7, line 40, "line" should read -- lines --;

Col. 7, line 44, "b" should be -- b' --;

Col. 8, line 1, "p" should be -- p' --;

Col. 8, line 8, "p" should be -- p' --;

Col. 8, line 19, "while" should be -- While --;

Col. 9, line 4, after "considered" insert a comma; and

Col. 9, line 13, "each" should read -- such --.

Signed and sealed this 15th day of July 1975.

(SEAL)
Attest:

RUTH C. MASON
Attesting Officer

C. MARSHALL DANN
Commissioner of Patents
and Trademarks